(12) United States Patent
Hoshino

(10) Patent No.: US 7,334,237 B2
(45) Date of Patent: Feb. 19, 2008

(54) DISC DRIVE APPARATUS

(75) Inventor: Toru Hoshino, Maebashi (JP)

(73) Assignee: Victor Company of Japan, Limited, Yokohama-shi, Kanagawa-ken (JP)

( * ) Notice: Subject to any disclaimer, the term of this patent is extended or adjusted under 35 U.S.C. 154(b) by 314 days.

(21) Appl. No.: 11/232,892

(22) Filed: Sep. 23, 2005

(65) Prior Publication Data

US 2006/0026607 A1 Feb. 2, 2006

Related U.S. Application Data

(63) Continuation-in-part of application No. 11/003,377, filed on Dec. 6, 2004.

(30) Foreign Application Priority Data

| Dec. 9, 2003 | (JP) | ............................. 2003-409745 |
| May 18, 2004 | (JP) | ............................. 2004-147311 |
| Sep. 27, 2004 | (JP) | ............................. 2004-279671 |

(51) Int. Cl.
*G11B 17/03* (2006.01)
(52) U.S. Cl. ...................... 720/501; 720/646; 720/647; 720/653; 720/606; 720/626; 720/645
(58) Field of Classification Search ................ 720/601, 720/646, 647, 653, 606, 626, 645
See application file for complete search history.

(56) References Cited

U.S. PATENT DOCUMENTS

| 4,573,092 | A | * | 2/1986 | Sugiyama et al. | ........ 360/99.06 |
| 4,803,604 | A | * | 2/1989 | Nichols et al. | ............. 362/154 |
| 5,056,071 | A | * | 10/1991 | Gehringer et al. | .......... 369/292 |
| 5,711,595 | A | * | 1/1998 | Gerbe | ............................ 362/84 |
| 6,414,928 | B1 | * | 7/2002 | Aoki et al. | .................. 720/703 |
| 6,798,600 | B2 | * | 9/2004 | Yoshimura | .................... 360/69 |
| 7,000,762 | B2 | * | 2/2006 | Goswami et al. | ......... 206/308.1 |
| 7,047,539 | B2 | * | 5/2006 | Miyagi | ........................ 720/646 |
| 7,181,750 | B2 | * | 2/2007 | Nakata | ........................ 720/646 |
| 2003/0021212 | A1 | * | 1/2003 | Platte et al. | ................... 369/92 |
| 2004/0160762 | A1 | * | 8/2004 | Fuwausa | ...................... 362/103 |
| 2005/0022217 | A1 | * | 1/2005 | Lee | ............................... 720/606 |
| 2006/0026607 | A1 | * | 2/2006 | Hoshino | ...................... 720/601 |
| 2006/0136959 | A1 | * | 6/2006 | Cheung | ....................... 720/728 |

FOREIGN PATENT DOCUMENTS

| GB | 2 247 769 | 3/1992 |
| JP | 60-194797 | 12/1985 |

(Continued)

*Primary Examiner*—Andrea Wellington
*Assistant Examiner*—Jason M. Garr
(74) *Attorney, Agent, or Firm*—The Nath Law Group; Jerald L. Meyer; Stanley N. Protigal

(57) ABSTRACT

A disc drive apparatus according to the present invention has a tray formed of an optically transparent material and has disc receiving portions. The tray is movable in an ejection and a retraction direction with respect to a casing. A light source is mounted inside the tray at the ejection direction side thereof. The light source emits light toward the ejection direction of the tray to cause the light to propagate within the optically transparent material from the retraction direction side through the ejection direction side of the tray with respect to the disc receiving portion.

7 Claims, 12 Drawing Sheets

FOREIGN PATENT DOCUMENTS

| | | |
|---|---|---|
| JP | 61-90095 | 6/1986 |
| JP | 62-39294 | 3/1987 |
| JP | 2002091352 A * | 3/2002 |
| JP | 2003-016769 | 1/2003 |
| JP | 2003-059157 | 2/2003 |

* cited by examiner

EJECTION DIRECTION

DISC DRIVE APPARATUS

CROSS REFERENCE TO RELATED APPLICATION

This application is a continuation-in-part of application Ser. No. 11/003,377, filed Dec. 6, 2004.

BACKGROUND OF THE INVENTION

1. Field of the Invention

The present invention relates to a disc drive apparatus for use in reading or writing data including music, image, and the like on a disc-type media such as a compact disc (CD), a compact disc recordable (CD-R), a digital versatile disc (DVD) and the like (hereafter collectively called a disc). More specifically, the present invention pertains to a disc drive apparatus equipped with a retractable tray on which a disc is placed.

2. Description of the Related Art

There has since been known a disc drive apparatus in which a user places or removes a disc directly on or from the apparatus, a disc drive apparatus in which an automatic disc changer is provided so that several discs are mounted at a time and one of them is automatically selected, and a disc drive apparatus in which a disc is ejected or inserted while kept on a tray.

Among them, according to a disc drive apparatus equipped with a disc tray, the disc to be played is placed on the tray and then the tray is inserted into the casing of the apparatus at the time of playing music for example. After inserted, the central portion of the disc is clamped with a turntable and a clamp plate and then the disc is kept raised from the tray. When the disc needs to be replaced with another, the disc is placed down on the tray and then the tray is ejected from the casing. The tray is provided with a disc receiving portion in a shape of a circular recess in which a disc is placed in position so as to be clamped adequately.

However, when the disc drive apparatus is placed in a dimly-lit place, the position of the disc receiving portion cannot be seen clearly and therefore a user may experience an inconvenience when he or she removes or places the disc from or on the disc receiving portion.

In order to eliminate such an inconvenience, there has been proposed a disc drive apparatus in which a light emitting element is equipped inside the tray and thereby illuminates the front face portion of the tray and the disc receiving portion. (Refer to Japanese Patent Application Laid-Open Publication S60-194797.)

In addition, there has been proposed a disc drive apparatus which is equipped with a prism secured at the front face of the tray, a light source provided over the tray in the casing so as to illuminate the disc on the tray, and a reflector for guiding the reflected light from the disc toward the prism, thereby allowing a user to recognize the disc without ejecting the tray. (Refer to Japanese Patent Application Laid-Open Publication S62-39294.)

Furthermore, there has been proposed a disc drive apparatus which is furnished with a light storing material on a peripheral portion of the disc receiving (disc accommodating) portion in the tray and a light source placed over the tray in the casing of the apparatus so as to brighten the luminous material. (Refer to Japanese Patent Application Laid-Open Publication 2003-16769.) Also, there has been proposed a disc drive apparatus which has notches on both ends of the tray and a semi-transparent arc-shaped member is secured at the notches, thereby allowing the light emitted from a light emitting diode to pass through the semi-transparent member. (Refer to Japanese Patent Application Laid-Open Publication 2003-59157.)

In the configurations described in Japanese Patent Application Laid-Open Publications S62-39294 and 2003-16769, since the light source is provided somewhere other than the tray, an extra room needs to be set aside for the light source, thereby causing some drawbacks in that the apparatus itself becomes inevitably larger and production costs are raised due to a provision of the prism and the reflector, which are an individual member. In addition, since the light source is fixated at an inner upper portion of the casing, it is difficult to obtain an appropriate amount of light enough to illuminate the disc receiving portion of the tray when the tray is ejected.

In the configurations described in Japanese Patent Application Laid-Open Publications S60-194797 and 2003-59157, even though the light source is provided in the tray, the light source can only illuminate the vicinity thereof and cannot successfully illuminate the whole area of the disc receiving portion or the tray. More importantly, while the disc receiving portion is usually configured so as to receive two types of discs, one having a larger diameter and the other having a smaller diameter, it is difficult in a conventional disc drive apparatus to distinguish the position on which a disc of each size should be placed in a dimly-lit place.

Furthermore, when the tray is retracted in the casing, a user cannot recognize a presence (or an absence) of a disc or a disc type (a CD, a DVD, or the like). The disc drive apparatus of this type usually includes a display made of a liquid crystal display panel or the like, which gives a character representation of a presence or absence of a disc inside, a disc type, an operation status (PLAY, REC, or the like). However, those characters are so small that they are not clearly visible away from them. In addition, since such a display in a disc drive apparatus for use in a car distracts a driver's attention, the display of this type needs to be improved.

SUMMARY OF THE INVENTION

The present invention has been made in view of the above circumstances. The objective of the present invention is to provide a disc drive apparatus in which the disc receiving portion of a disc tray can be illuminated while avoiding an increase in size and costs as much as possible.

Another objective of the present invention is to provide a disc drive apparatus in which the entire area of the disc receiving portion or the tray can be illuminated with a splendid decorative effect of light.

Yet another objective of the present invention is to provide a disc drive apparatus in which at least one of pieces of information on a presence or absence of a disc, a disc type, and an operation status is easily recognized.

In order to achieve the above objective, a first aspect of the present invention provides a disc drive apparatus comprising a casing, a tray formed of an optically transparent material, including a disc receiving portion for a disc to be placed on and being movable in an ejection and a retraction direction in relation to said casing, said tray having a first reflection face reflecting light that enters said tray so as to illuminate a disk face of said disc placed on said disc receiving portion and said tray reflecting light that is reflected by said disc face so as to enter therein and thereby to radiate outward, and a light source allowing light to enter said tray.

A second aspect of the present invention provides a disc drive apparatus according to the first aspect, wherein said tray has a second reflection face reflecting light that has entered therein by being reflected by said disc face of said disc so as to radiate outward.

A third aspect of the present invention provides a disc drive apparatus according to the first aspect, wherein said light source is mounted inside of said tray.

A fourth aspect of the present invention provides a disc drive apparatus according to the first aspect, wherein said tray has a luminous portion adopted to outwardly radiate the light emitted from said light source.

A fifth aspect of the present invention provides a disc drive apparatus according to the fourth aspect, wherein said luminous portion includes a front end portion of said tray with respect to the ejection direction.

A sixth aspect of the present invention provides a disc drive apparatus according to the fourth aspect, wherein said luminous portion includes a circumferential edge of said disc receiving portion.

A seventh aspect of the present invention provides a disc drive apparatus according to the third aspect, wherein said light source stays inside of said casing when said tray is ejected from said casing.

According to the present invention, the disc tray having the disc receiving portion on which a disc is placed is made of a transparent material and provided with a first reflection face for reflecting light propagating in the tray toward the disc receiving portion, thereby illuminating the disc receiving portion. Therefore, a user can easily change discs even in a dimly-lit environment.

In addition, the light propagating in the tray is reflected firstly by the first reflection face, secondly by the disc placed on the disc receiving portion, and thirdly by the second reflection face. Then, the light emits out from the tray. Therefore, the light emitting end of the tray glows with the light emitted from the tray, thereby providing a decorative effect of light.

DESCRIPTION OF THE PREFERRED EMBODIMENTS

Referring to accompanying drawings, preferred embodiments of the present invention will be explained in detail hereinafter. It should be understood that the following detailed descriptions of the preferred embodiments of the present invention are intended for purposes of illustration only and are not intended to limit the scope of the invention.

A First Embodiment

Figure 1:
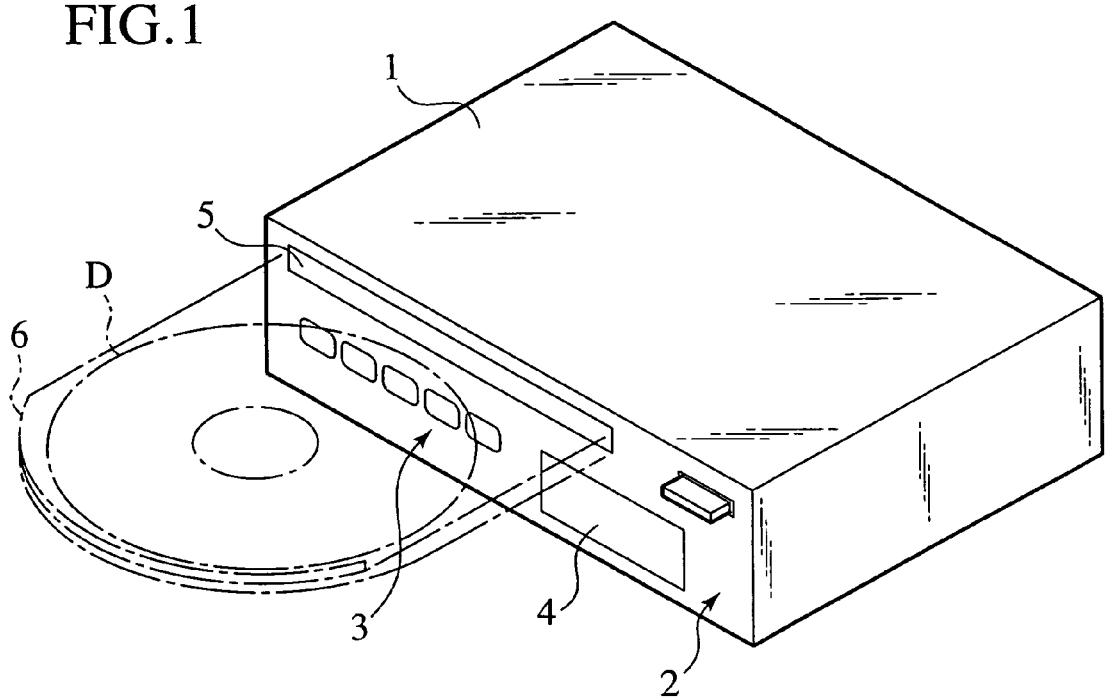
FIG. 1 is a perspective view of a disc drive apparatus according to a first embodiment of the present invention.

FIG. 1 is a perspective view of a disc drive apparatus according to a first embodiment of the present invention. The apparatus exemplified in FIG. 1 is a CD player for reproducing audio data on music CDs. On the front face of the apparatus casing 1, which includes an outer cover and an inner chassis, there are provided a group of operation switches 3 that are adopted to send a particular control signal to an internal control circuit as an operation portion 2, a display portion 4 that shows an operation status of a control system or the like, and a slit-like opening 5. The operation switches 3 include a start button, a track scanning button, a pause button, and an ejection button (for ejecting a disc) as well as a main power switch. Also, the disc drive apparatus is provided with a tray 6 for receiving a disc D to be played that is formed so as to move in and out through the opening 5.

In operation, according to the disc drive apparatus with the above configuration, the disc D to be played is placed on the tray 6 that extends horizontally from the opening 5, the tray 6 is pushed into the casing 1, and then the recorded data is reproduced into music. When taking out a disc or replacing discs, the disc D can be ejected out from the casing 1 through the opening 5 by depressing the ejection button while being kept on the tray 6.

Figure 2:
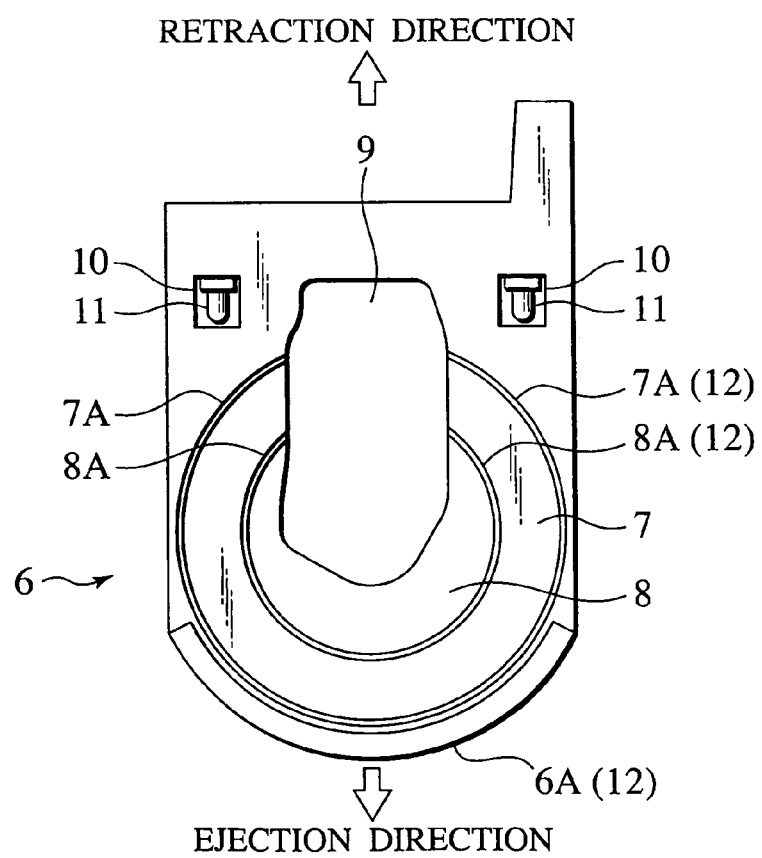
FIG. 2 is a plane view of a tray according to the first embodiment.
Figure 3:
FIG. 3 is a schematic side view of the tray according to the first embodiment.

FIG. 2 is a plane view of the tray 6. In FIG. 2, the tray 6 is formed of an optically transparent material such as an acrylic resin and polycarbonate. Although it is preferable that the tray 6 is uniformly transparent as a whole, a part or the whole of the tray 6 may be translucent. Reference marks 7, 8 designate disc receiving portions composed of concentrically formed circular recesses. The disc receiving portion 7 is intended to receive a larger CD with a larger diameter (a CD having a diameter of 12 cm, in this embodiment). The disc receiving portion 8, which is formed inside the disc receiving portion 7, is intended to receive a smaller CD with a smaller diameter (a CD having a diameter of 8 cm, in this embodiment). When not mentioned, the disc is referred to as disc D regardless of the size.

Moreover, in the central portion of the tray 6, a cutout is provided spanning from the center of the disc receiving portions 7, 8 to a rear portion of the tray 6 with respect to the ejection direction (in other words, along the retraction direction of the tray 6). The cutout 9 is intended to let laser beam from an optical pickup device (not shown) pass therethrough to reach the data-containing side (play side) of the disc D placed on the disc receiving portion 7 or 8. In other words, the cutout 9 is formed along the moving path of the optical pickup device that moves while irradiating the laser beam on the play side and receiving reflected light therefrom. Also, the cutout 9 is formed so as to let a turntable (described later) that supports the lower central portion of the disc D pass therethrough at one end thereof.

Furthermore, the tray 6 is provided with two light source mounting portions 10 (rectangular holes, in this embodiment) located at a rear portion of the tray 6 in relation to the disc receiving portions 7, 8 (or, at the retraction direction side of the tray 6). A light source 11 composed of a light emitting diode is attached to the light source mounting portions 10 facing the front end face of the mounting portion 10 so as to emit light toward the ejection direction of the tray 6 in which the disc receiving portions 7, 8 are formed. The light emitted from the light source 11 is able to enter the tray 6 from the direction perpendicular to the thickness direction of the tray 6 because the tray 6 is made of an optically transparent material. Then, the light propagates within the tray 6 (or, the optically transparent material) and comes out topically from a step-shaped circumferential edge of the disc receiving portions 7, 8. Therefore, the circumferential edge of the disc receiving portions 7, 8 glows brightly as a luminous portion 12.

In addition, a major part of the light emitted from the light source 11 reaches a front end portion 6A of the tray 6 and comes out topically therefrom. Thus, the front end portion 6A glows more brightly as the luminous portion 12 than the rest of the tray 6, thereby providing a decorative effect of light. In addition, since the tray 6 glows brightly at areas in front of and behind the disc receiving portions 7, 8 as the luminous portion 12, the portions for the disc D to be placed on is clearly seen even in a dimly-lit place.

Incidentally, when there is a face intersecting with the light propagation direction at about 30 degrees or more, it can serve as the luminous portion 12 since the light propagating within the casing 1 can come out therefrom. For this reason, the luminous portion 12 can be formed to be a curved face as well as a planar surface.

According to the first embodiment, since the front end portion 6A constituting the luminous portion 12 is provided so as to oppose the light source 11 with the disc receiving portions 7, 8 in-between, the light emitted from the light source 11 is able to propagate within the optically transparent material from rear to front with respect to the ejection direction, passing by the disc receiving portion 7, 8, and then reaches the front end portion 6A. Thus, the tray 6 glows faintly as a whole. Furthermore, since the front end portion 6A and the circumferential edges 7A, 8A of the disc receiving portions 7, 8 serve as the luminous portion 12, the disc receiving portion 7, 8 becomes more clearly recognizable.

Next, additional minute details in order to make this embodiment more preferable will be explained hereinafter. In order to allow the front end portion 6A of the tray 6 to glow more brightly as the luminous portion 12, the tray 6 is formed into a tapered shape with its thickness gradually decreasing from rear to front with respect to the ejection direction. Also, in order to avoid light leak from the tray 6, no holes are provided in the tray 6 even though such a hole can be useful for a user to handle discs, for example, by inserting his or her fingers therethrough to pick up the disc.

Moreover, in order to avoid attenuation in light intensity, the surface of the tray 6 is made into a mirror surface.

Figure 4:
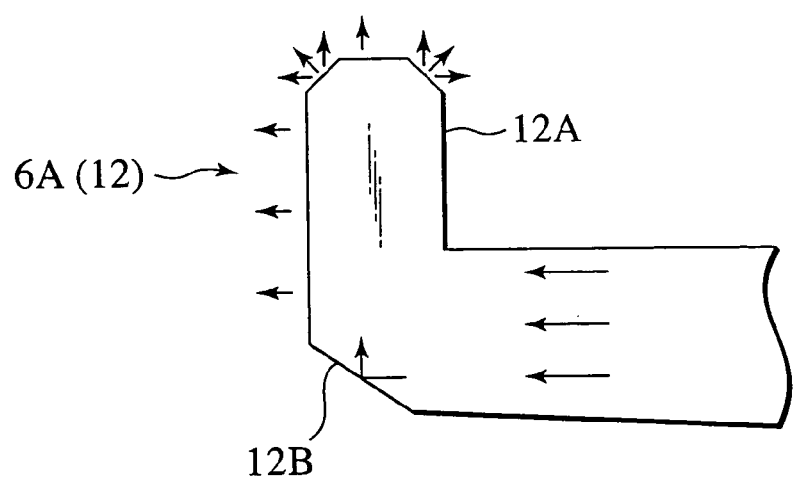
FIG. 4 is an enlarged view of the front end portion of the tray according to the first embodiment.

Furthermore, in the front end portion 6A of the tray 6, a projection wall 12A as the luminous portion 12 is formed perpendicular to the board surface of the tray 6 as shown in FIG. 4. At the bottom of the projection wall 12, a sloped face 12B is formed to effectively guide upwardly the light emitted from the light source 11. In addition, the top portion of the projection wall 12 is formed into a multi-faced shape in order to effectively diffuse the light guided from the sloped face 12B.

Figure 5:
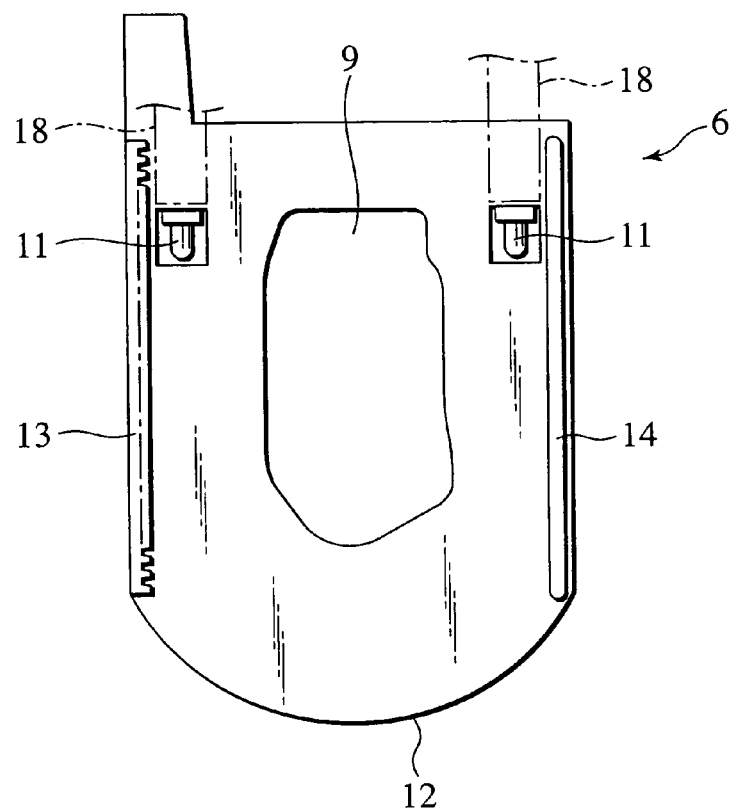
FIG. 5 is a bottom view of the tray according to the first embodiment.

Now referring to FIG. 5, a rack 13 and a guide groove 14 are parallelly formed in the reverse side edge of the tray 6. The rack 13 is engaged with a pinion (not shown) provided in the casing 1. In addition, a pin (not shown) is inserted into the guide groove 14. With this configuration, the tray 6 can move reciprocally into and out of the casing (in the ejection and the retraction direction in relation to the casing) while being maintained horizontally by a rotation of the above-mentioned pinion.

Figure 6:
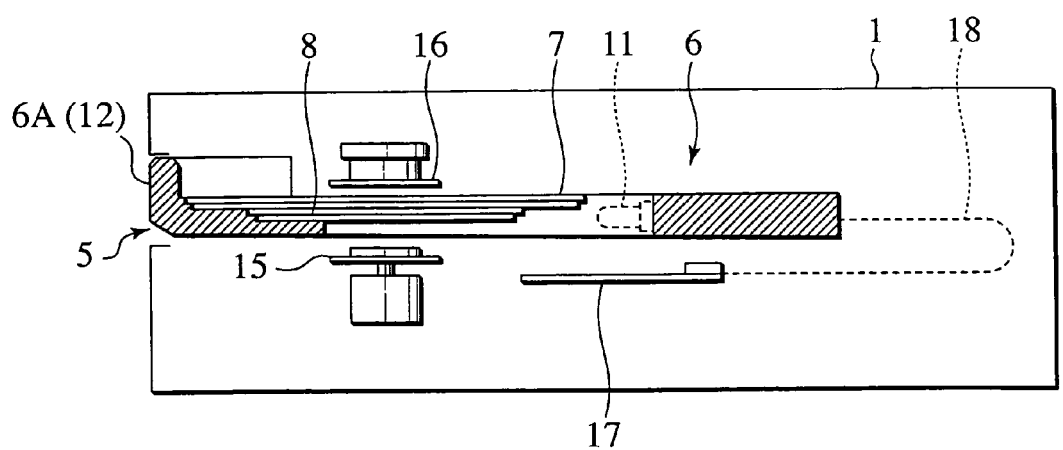
FIG. 6 illustrates that the tray according to the first embodiment is retracted inside the casing.

FIG. 6 illustrates that the tray 6 is retracted inside the casing 1. When the tray 6 is retracted, the center portion of the disc D placed on the disc receiving portion 7 (8) aligns vertically with the turntable 15 and the opposing clamp plate 16. Then, the turntable 15 is raised to clamp the center portion of the disc D in cooperation with the clamp plate 16 and thereby the disc D is kept slightly away from the disc receiving portion 7 (8) so that the disc D can rotate. Incidentally, in FIG. 6, a reference mark 17 designates a circuit board that is adopted to turn on the light source 11 and fixated beneath the tray 6 inside the casing 1. The circuit board 17 is connected to the light source 11 with a flexible electrically conductive member 18 (flexible printed wiring tape) in order not to obstruct the movement of the tray 6. The length of the flexible electrically conductive member 18 is determined taking account of the moving distance of the tray 6 so that even when the tray 6 is ejected from the casing 1, the member 18 is still electrically connected with the light source 11, thereby supplying sufficient electric power to the light source 11.

Moreover, it is apparently seen from FIG. 6 that the front end portion 6A (the luminous portion 12) fits in the position of the opening 5 of the casing 1 and is still visible when the tray 6 is retracted. Thus, the front end portion 6A glows at the position of the opening 5 of the casing 1, thereby providing a decorative effect of light even when the tray 6 is retracted.

Figure 7:
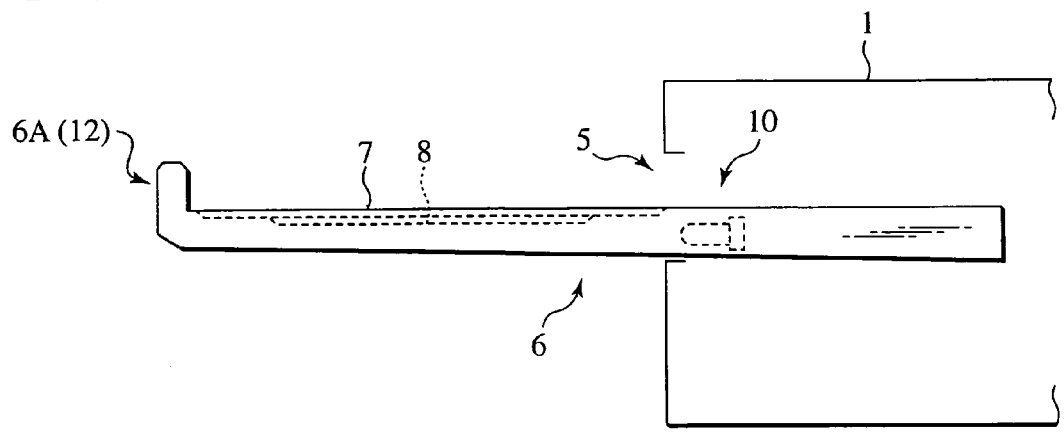
FIG. 7 illustrates that the tray according to the first embodiment is ejected from the casing.

On the other hand, FIG. 7 illustrates that the tray 6 is ejected from the casing 1. When the tray is ejected, a front portion of the tray 6 that includes the disc receiving portion 7 (8) protrudes from the opening 5 and a rear portion of the tray 6 that includes the light source mounting portions 10 remains inside the casing 1. Thus, the light source 11 does not appear outside of the casing 1 and remains inside the casing 1, thereby preventing aesthetic appearance of the disc drive apparatus 1 from being detracted. In addition, even when the tray 6 is ejected, the luminous portion 12 including the front end portion 6A glows brightly since the light source 11 turns on, thereby providing a decorative effect of light. Particularly, since areas in front of and behind the disc receiving portion 7, 8 (the front end portion 6A of the tray 6 and rear circumferential edges 7A, 8A of the disc receiving portions 7, 8) glow brightly and the inner area of the disc receiving portion 7, 8 glows, though faintly, a user can easily place and remove a disc even in a dimly-lit place.

While one of preferable embodiments according to the present invention has been illustrated above, the light source 11 can be mounted differently on the tray 6 so far as the light source 11 is provided so as to illuminate the tray 6 from the direction perpendicular to the thickness direction of the board of the tray 6 and the light propagates in the tray 6 and exits out topically from the luminous portion 12 that is formed away from the light source 11. In other words, even though the position of the light source 11 is not limited to the rear portion of the tray 6 with respect to the ejection direction, it is preferable that the light source 11 is mounted so as to emit light toward the disc receiving portion 7, 8.

A Second Embodiment

Figure 8:
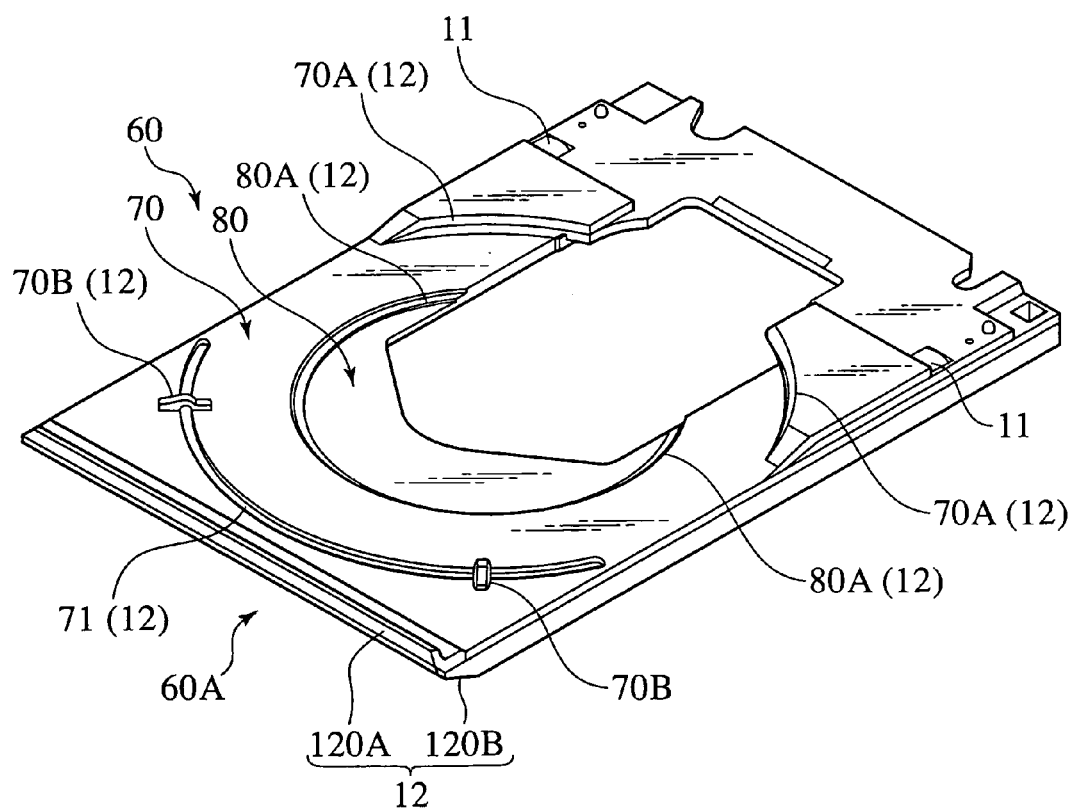
FIG. 8 is a perspective view of a tray according to a second embodiment.

So far as the tray 6 is provided with the light source 11 and the corresponding luminous portion 12, the whole configuration is not limited to that in the first embodiment. The tray 6 may have a different configuration, for example, as shown in FIG. 8, which illustrates a second embodiment. Disc drive apparatus according to the second embodiment is different from that according to the first embodiment in that the second embodiment has a tray 60 as shown in FIG. 8 instead of the tray 6 in the first embodiment. So, only the tray 60 will be described hereinafter and explanations about the other elements will be omitted. In addition, same reference marks may be used to designate the same or substantially the same elements in FIG. 2.

In FIG. 8, a front end portion 60A of the tray 60 with respect to the ejection direction is the same as the front end portion 6A in the first embodiment from the perspective that it is formed into the luminous portion 12 including a projection wall 120A having a multi-faced top and a sloped face 120B for guiding the light emitted from the light source 11 toward the projection wall 120A. However, the front end portion 60A of the tray 60 is formed into not a circular-arc but a linear luminous portion 12. Also, in FIG. 8, a disc receiving portion 70 is composed of rear circumferential edges 70A, 70A defined by a circular-shaped wall face that projects from the rear portion of the board of the tray 60 with respect to the ejection direction and protrusions 70B, 70B formed in a front portion of the tray 60 with respect to the ejection direction. An area defined by the rear circumferential edges 70A, 70A and the protrusions 70B, 70B can support a larger diameter disc. In addition, the front portion of the tray 60 with respect to the ejection direction is provided with a circular groove 71 that runs through the protrusions 70B, 70B and along the circumferential edge of the disc when the disc D is placed on the disc receiving portion 70. The protrusions 70B, 70B and the circular groove 71 constitute a front circumferential edge of the disc receiving portion 70.

In addition, the disc receiving portion 70 is provided with a recess defined by a circular-arc-shaped step. The recess serves as a disc receiving portion 80 for receiving a small diameter disc and the step serves as a circumferential edge 80A as the luminous portion 12.

Also in this embodiment, a light source 11 is provided in the rear portion of the tray 60 with respect to the ejection direction of the tray 60. The light emitted from the light source 11 propagates through the tray 60 formed of an optically transparent material and comes out topically from the rear circumferential edge 70A of the disc receiving portion 70, the circumferential edge 80A of the disc receiving portion 80, the protrusion 70B, the circular groove 71 and the front end portion 60A. In other words, in this embodiment, the circumferential edges 70A, 80A of the disc receiving portions 70, 80, the front face portion of the protrusion 70B, the light source 11 side of the circular groove 71 and the front end portion 60A of the tray 60 with respect to the ejection direction serve as the luminous portion 12 that allows the light emitted from the light source 11 to irradiate outward and thereby glows more brightly than any other portion of the tray 60.

In the second embodiment, since the circular groove 71 is provided as the front circumferential edge of the disc receiving portion 70, the circular groove 71 glows more brightly than a wall face that might be provided instead of the front circumferential edge in the same manner as the wall face 70A. Thus, since both the wall face at the rear circumferential edge 70A of the disc receiving portion 70 and the circular groove 71 as the front circumferential edge glow brightly, the disc receiving portions 70, 80 are more easily recognizable even in a dimly-lit place than the disc receiving portions 7, 8 of the first embodiment.

A Third Embodiment

Figure 9:
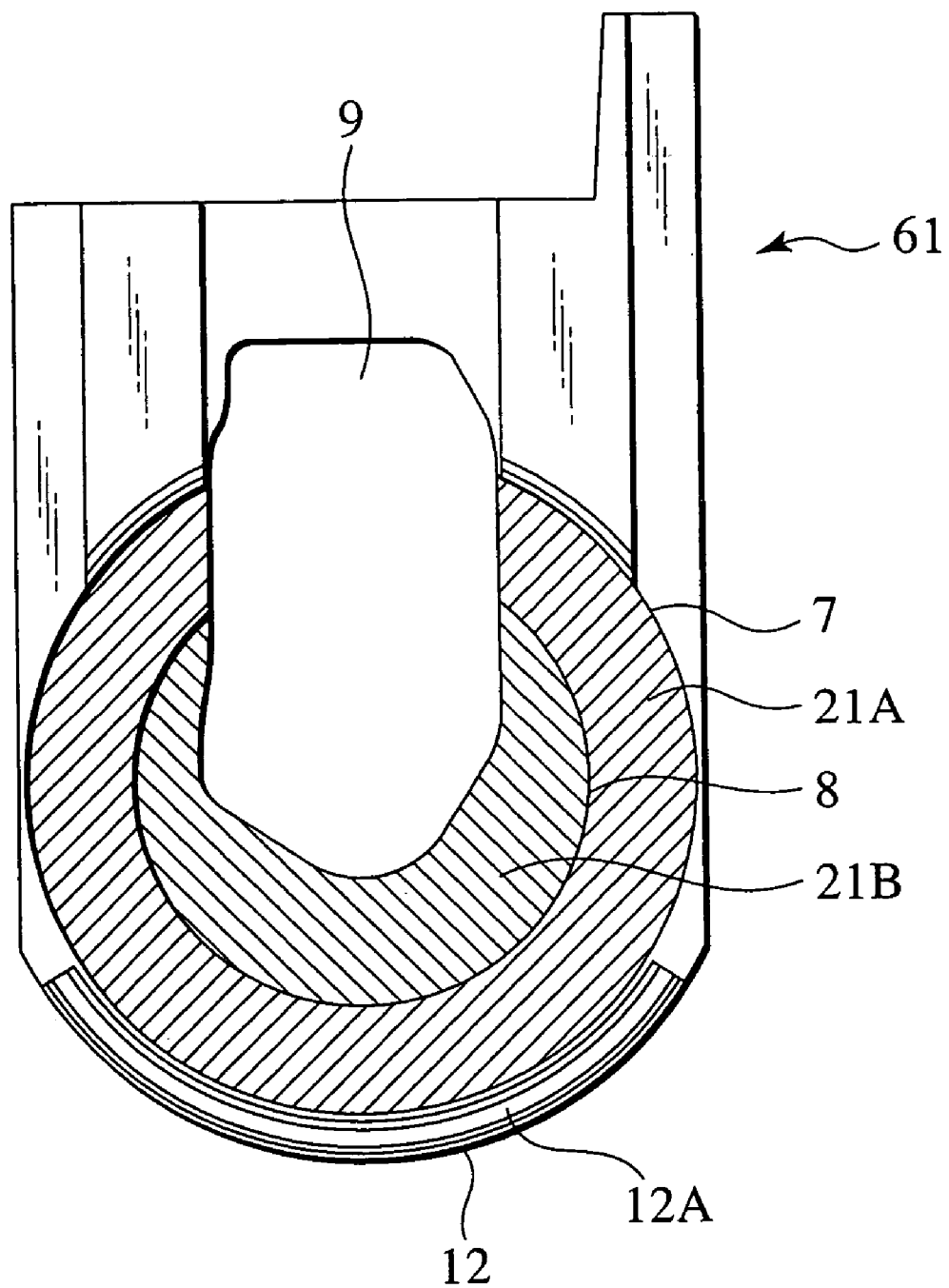
FIG. 9 is a plane view of the tray according to the second embodiment.

Next, a third embodiment will be described referring to FIG. 9. Since the third embodiment is different from the first embodiment only in that a tray 61 shown in FIG. 9 is used instead of the tray 6 in the first embodiment, only the tray 61 will be explained and explanations about other elements will be omitted. In addition, in FIG. 9, same reference marks may be used to designate the same or substantially the same elements in FIG. 2.

In FIG. 9, reference marks 21A, 21B designate a light source for a disc receiving portion 7 and for a disc receiving portion 8, respectively. The light sources 21A, 21B can be for example an organic electroluminescence sheet and affixed on the bottom face of the disc receiving portion 7, 8 with an adhesive or the like. But an inorganic electroluminescence (EL) sheet or other light emitting sheet can be used as the light sources 21A, 21B instead of the organic electroluminescence sheet. When the light sources 21A, 21B are formed into such a sheet shape, the disc receiving portions 7, 8 can glow two-dimensionally.

The light sources 21A, 21B emit light having a respectively different color and thereby the disc receiving portions 7, 8 glow in a different color with each other. In addition, the light source 21A is formed into a ring shape and affixed on an area of disc receiving portion 7 excluding the disc receiving portion 8 (an area inside the disc receiving portion 7 and outside the disc receiving portion 8). The light sources 21A, 21B are also connected to the circuit board 17 fixated inside the case 1 with the flexible electrically conductive member 18. Therefore, by turning on these light sources 21A, 21B at the time of ejecting the tray 61, the disc receiving portions 7, 8 can glow in a respectively different color and thereby easily recognized even in a dimly-lit place. In the third embodiment, the tray 61 is not necessarily made of an optically transparent material. In addition, the light sources 21A, 21B can be composed of light emitting diodes that are embedded in the tray 61 at predetermined intervals along the peripherals of the disc receiving portions 7, 8.

A Fourth Embodiment

Figure 10:
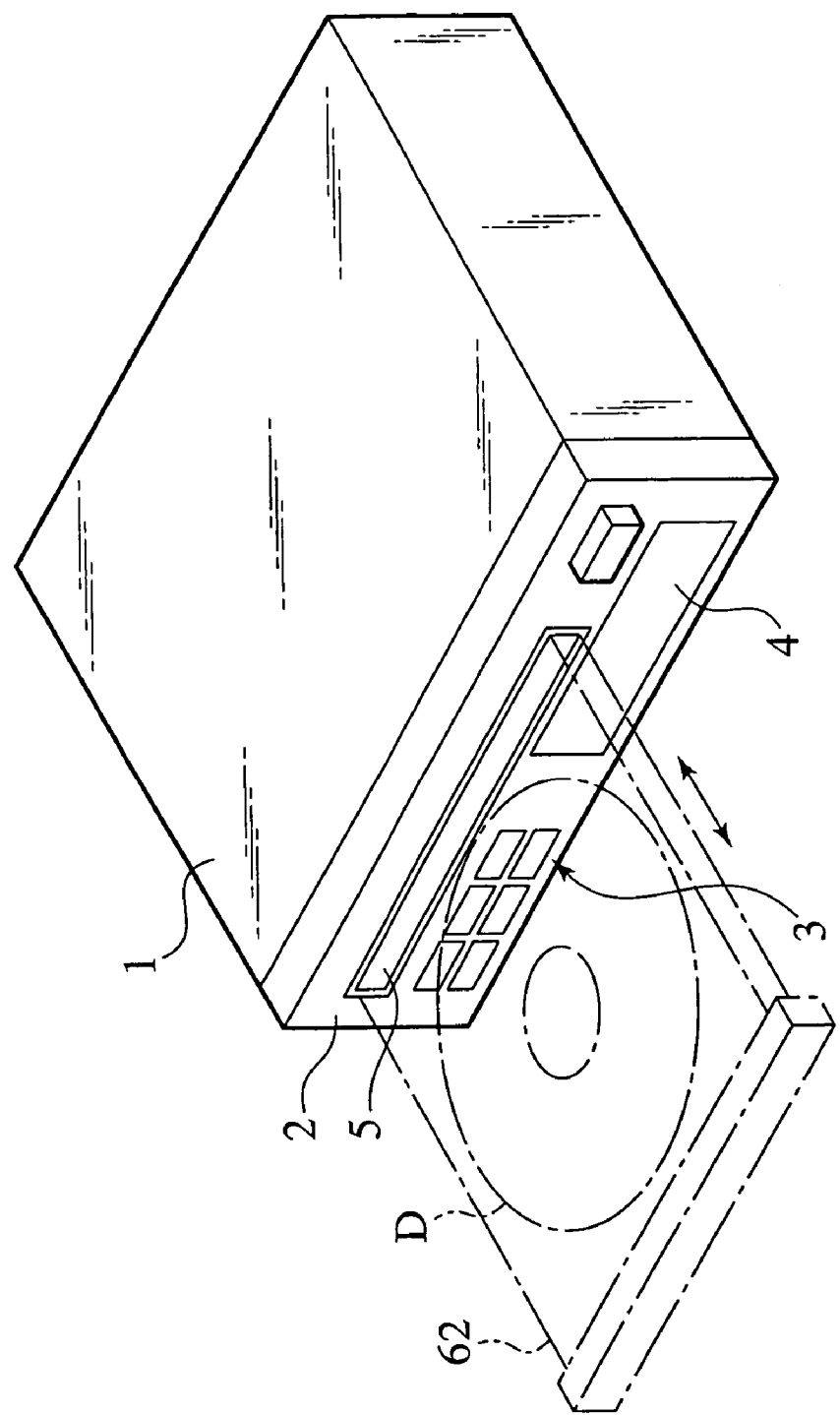
FIG. 10 is a perspective view of a tray according to a fourth embodiment.
Figure 11:
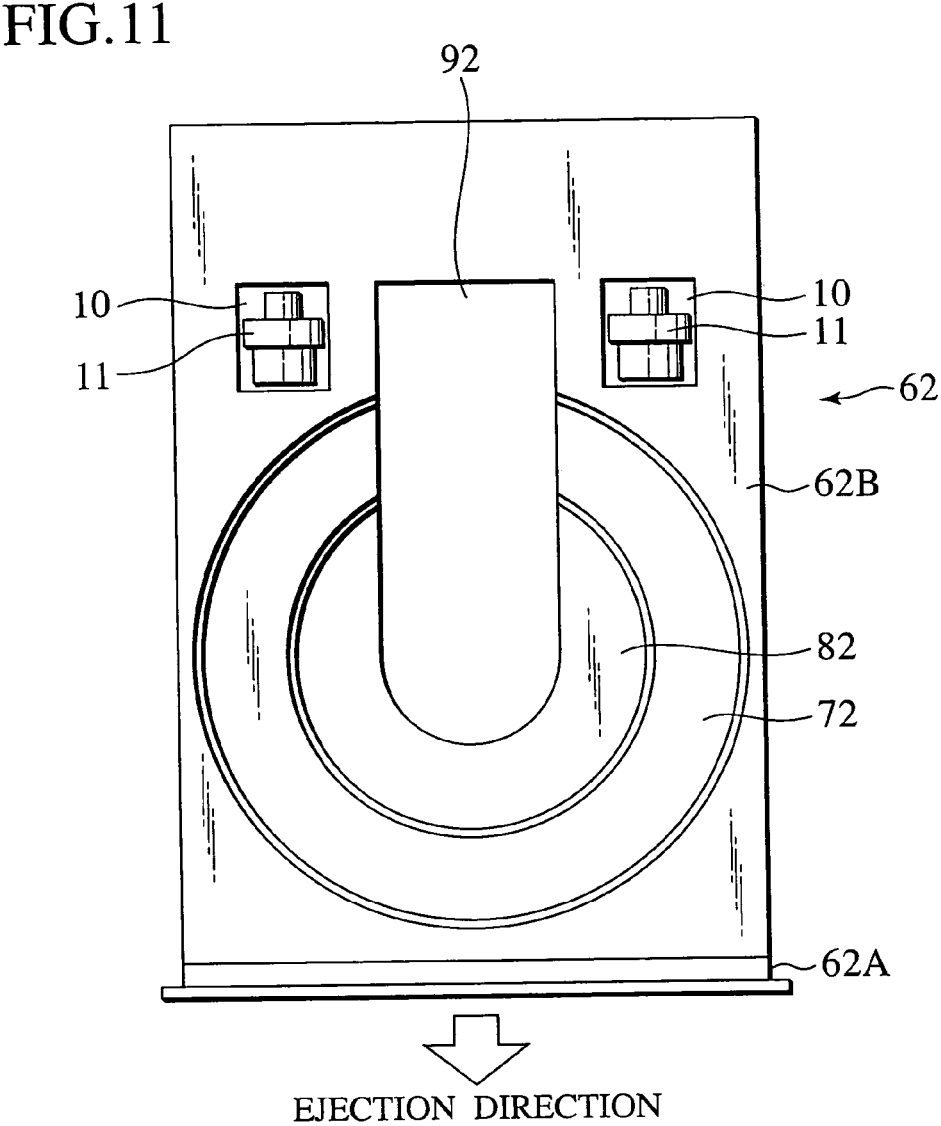
FIG. 11 is a plane view of the tray according to the fourth embodiment.

While a disc drive apparatus according to a fourth embodiment has substantially the same tray as that in the first and the second embodiment, it is constructed so as to recognize at least one of pieces of information on a presence or absence of a disc on the tray, a disc size, and an operational status of the apparatus. The fourth embodiment uses a tray 62 having not a circular but a linear front end portion in the same manner as the second embodiment, as shown in FIGS. 10 and 11, instead of the tray 6 in the first embodiment. But the front end portion may be circular in the same manner as the first embodiment. In addition, in FIG. 11, same reference marks may be used to designate the same or substantially the same elements as in FIG. 2 and explanations about common elements will be omitted except when needed.

Referring to FIG. 11, a tray 62 is formed entirely of an optically transparent material, for example, such as an acrylic resin or polycarbonate. A front end portion of the tray 62 with respect to the ejection direction is formed as a light diffuser 62A for diffusing the light emitted from a light source 11 and the light diffuser 62A is detachably provided on a tray body 62B having disc receiving portions 72, 82. In the center portion of the tray body 62B, a cutout 92 is provided along the radial direction from the center portion of the disc receiving portions 72, 82.

Figure 12:
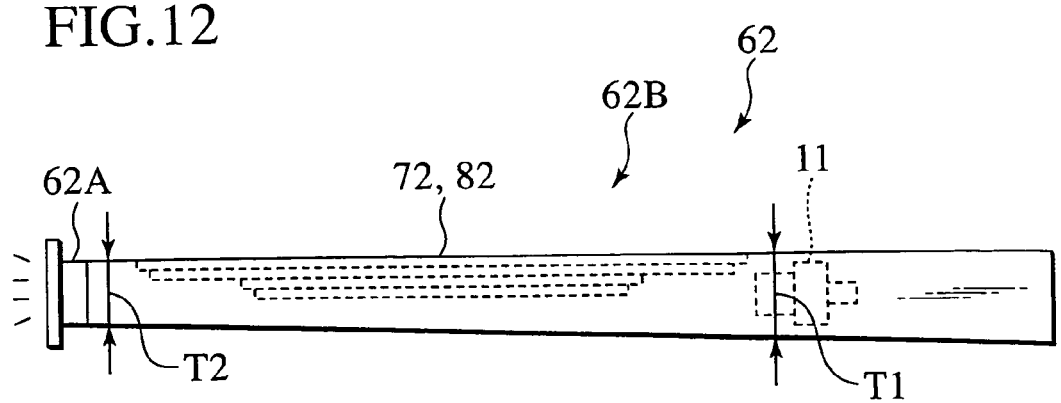
FIG. 12 is a schematic side view of the tray according to the fourth embodiment.

In the tray 62 illustrated in FIG. 11, the light emitted from the light source 11 enters the tray 62 from the direction perpendicular to the thickness direction of the tray 62, propagates the tray 62 and then exits topically from a step-shaped rear circumferential edge of the disc receiving portion 72, 82. In addition, as shown in FIG. 12, a major part of the light emitted from the light source 11 reaches the front end portion (the light diffuser 62A) of the tray 62 and exits topically from the light diffuser 62A, as well. Thus, the rear circumferential edges of the disc receiving portions 72, 82 and the light diffuser 62A glow brightly.

As shown in FIG. 12, the tray 62 is preferably tapered at angles that enable the light from the light source 11 to totally reflect between the upper and the lower surface. With this construction, the light can be conversingly guided to the light diffuser 62A while totally reflecting between the two surfaces of the tray 62. While the tapered shape of the tray 62 is formed by inclining one of the two surfaces toward the tray moving direction in FIG. 12, the shape may also be formed by inclining both of the two surfaces. In addition, while the tray 62 is preferably tapered continuously, the tray 62 can be tapered intermittently.

In sum, the tray 62 is preferably formed so that the board thickness of the tray 62 becomes smaller along the direction from the vicinity of the light source 11 to the front end portion (the light diffuser 62A). In other words, it is preferable that the thickness T2 near the light diffuser 62A is smaller than the thickness T1 at the vicinity of the light source 11 and thereby T1/T2, which is a focusing factor, is larger than 1.

Figure 13:
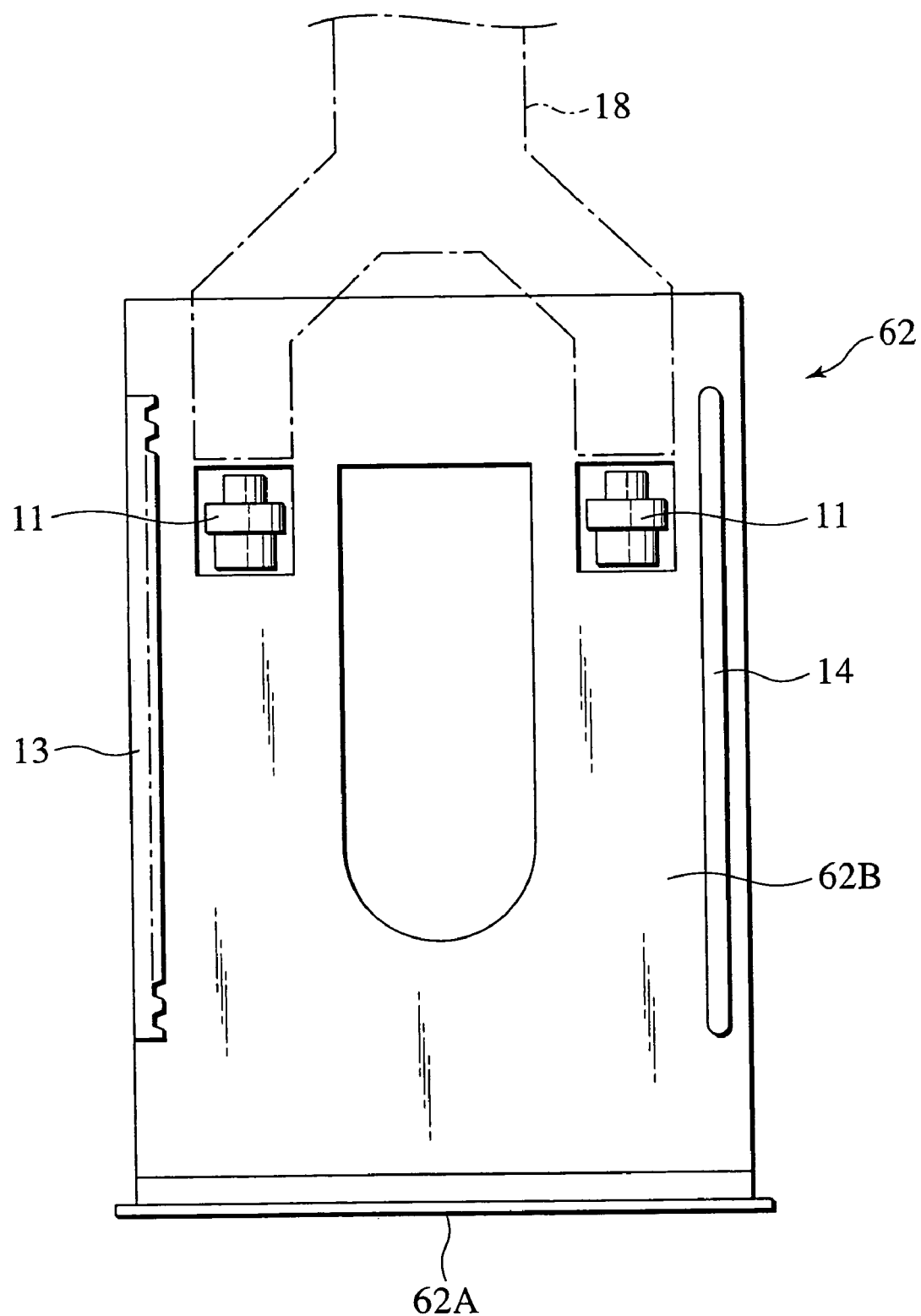
FIG. 13 is a bottom view of the tray according to the fourth embodiment.

As shown in FIG. 13, the structure of the reverse side of the tray 62 is substantially the same as that in FIG. 5.

Figure 14:
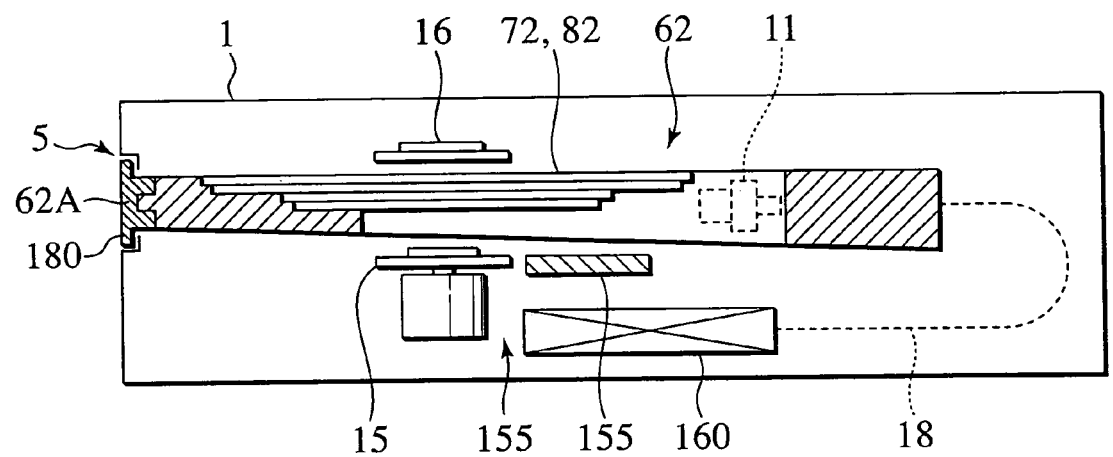
FIG. 14 illustrates that the tray according to the fourth embodiment is retracted inside a casing.

FIG. 14 illustrates that the tray 62 is retracted inside the casing 1. When the tray 62 is retracted with the disc D placed on the disc receiving portion 72, the center portion of the disc D aligns vertically with a turntable 15 and an opposing clamp plate 16. Then, the turntable 15 is raised to clamp the center portion of the disc D in cooperation with the clamp plate 16. After that, the disc rotates while being maintained slightly away from the disc receiving portion 72 and the data stored in the disc D is read by an optical pickup 150 that moves along the radial direction of the disc D when the disc drive apparatus is in play mode. Here, the turntable 15 and the optical pickup 150 constitute the disc driving portion 155 that reads and writes the disc D.

In FIG. 14, a reference mark 160 designates a controller (a micro computer, for example) controlling the above-mentioned disc driving portion 155 and light source 11. The controller 160 is fixated beneath the tray 62 inside the casing 1 and connected to the light source 11 with a flexible electrically conductive member 18 of a tape shape in order not to disturb the movement of the tray 62.

As apparent from FIG. 14, when the tray 62 is retracted inside the casing 1, the light diffuser 62A constituting the front end portion of the tray 62 is positioned and exposed at the opening 5 in the front face of the casing 1. In addition, the light diffuser 62A serves as a cover 180 for sealing the opening 5, thereby preventing foreign materials such as dusts from entering the casing 1. Also, the light diffuser 62A glows at the position of the opening 5 by diffusing the light emitted from the light source 11, thereby providing an excellent decorative effect of light.

In the fourth embodiment, a light emitting element constituting the light source 11 is controlled to emit light based on predetermined control information. As the control information, there can be used one of pieces of information on a specific identification data (for example, a disc type) stored in the disc D, a presence or absence of the disc D on the tray 62 retracted inside the casing 1, a size of the disc D, a position of the tray 62 (the ejected position, the retracted position, or moving) and an operation status (reading, writing, pause, a position of the optical pickup or the like) of the disc driving portion 155.

As information for controlling the light source 11 emitting light, one or more of pieces of information such as specific identification data stored in the disc D, a presence or absence information about the disc D on the tray 62, size information about the disc D, position information about the tray 62 and operation status information about the disc driving portion 155.

Figure 15:
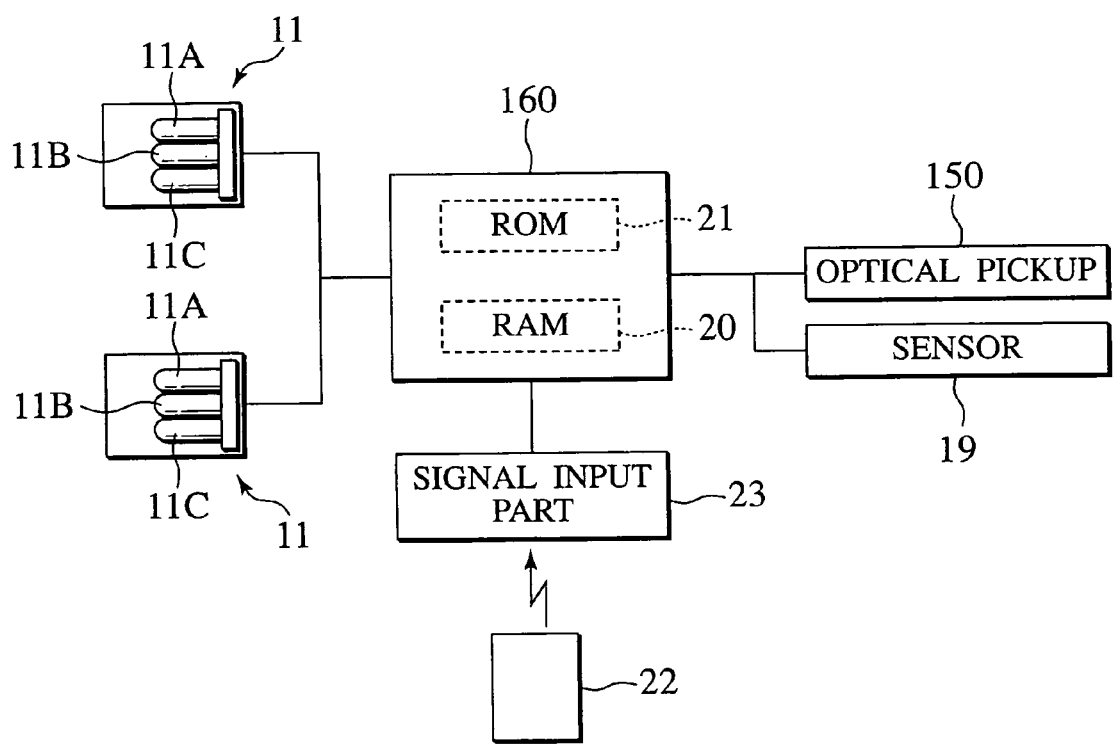
FIG. 15 is an explanatory block diagram for the fourth embodiment.

As shown in FIG. 15, the light source 11 includes light emitting elements 11A, 11B, 11C (in this embodiment the light source 11 being a tricolor light emitting diode having a red light emitting diode, a green light emitting diode, and a blue light emitting diode) and each light emitting element 11A, 11B, 11C is controlled separately based on the above-mentioned control information. Therefore the light source 11 emits light having various colors ranging from three primary colors (red, green, blue) to a mixture of two or all of primary colors. The light emitting elements are not necessarily provided separately but integrated into one body by being encapsulated for example with a resin.

Furthermore, the light source 11 can be constructed for example with a red light emitting diode and a green light emitting diode, or a single unicolor LED. Even when the light source 11 is constructed only with a unicolor LED, the light from the light source 11 can let a user know for example whether or not the disc D is on the tray 62 by changing blinking interval or light intensity (an amount of light emitted therefrom).

On another matter, the controller 160 is provided with a RAM 20 for storing the above-mentioned control information obtained by the optical pickup 150 or a sensor provided in the casing 1, a ROM 21 for storing a program that controls the light source 11 based on the control information stored in the RAM 20. The controller 160 constitutes a light source control means. The sensor 19 serves as a control information generator that generates control information based on at least one of pieces of information on a presence or absence of the disc D on a tray 62, a size of disc D, a specific identification data stored on the disc D, a position of the tray 62, and an operation status of the disc driving portion 155.

The RAM 20 inputs through the optical pickup 150, for example, TOC (Table of content) information including a type of the disc D (CD, DVD and the like), a title of music or a movie and an artist name, the TOC information being recorded on the inner circumference lead-in area of the disc D, as a specific identification data stored on the disc D. Also, the RAM 20 inputs through the optical pickup 150 the above-mentioned information on a presence or absence of the disc D in the casing 1, a disc size, a position of the tray 62, an operation status of the disc driving portion 155 and the like.

The controller 160 is capable of controlling light emitting elements 11A-11C of the light source 11 separately to change emitting patterns, such as a color of the light emitted from the light source 11, its blinking interval, and luminosity (strength of light) based on the above-mentioned control information stored on the disc D, such as a specific identification data, and an operation status the disc driving portion 155 or the like. As an example, the flow of processing by the controller 160 is shown in FIG. 16.

Figure 16:
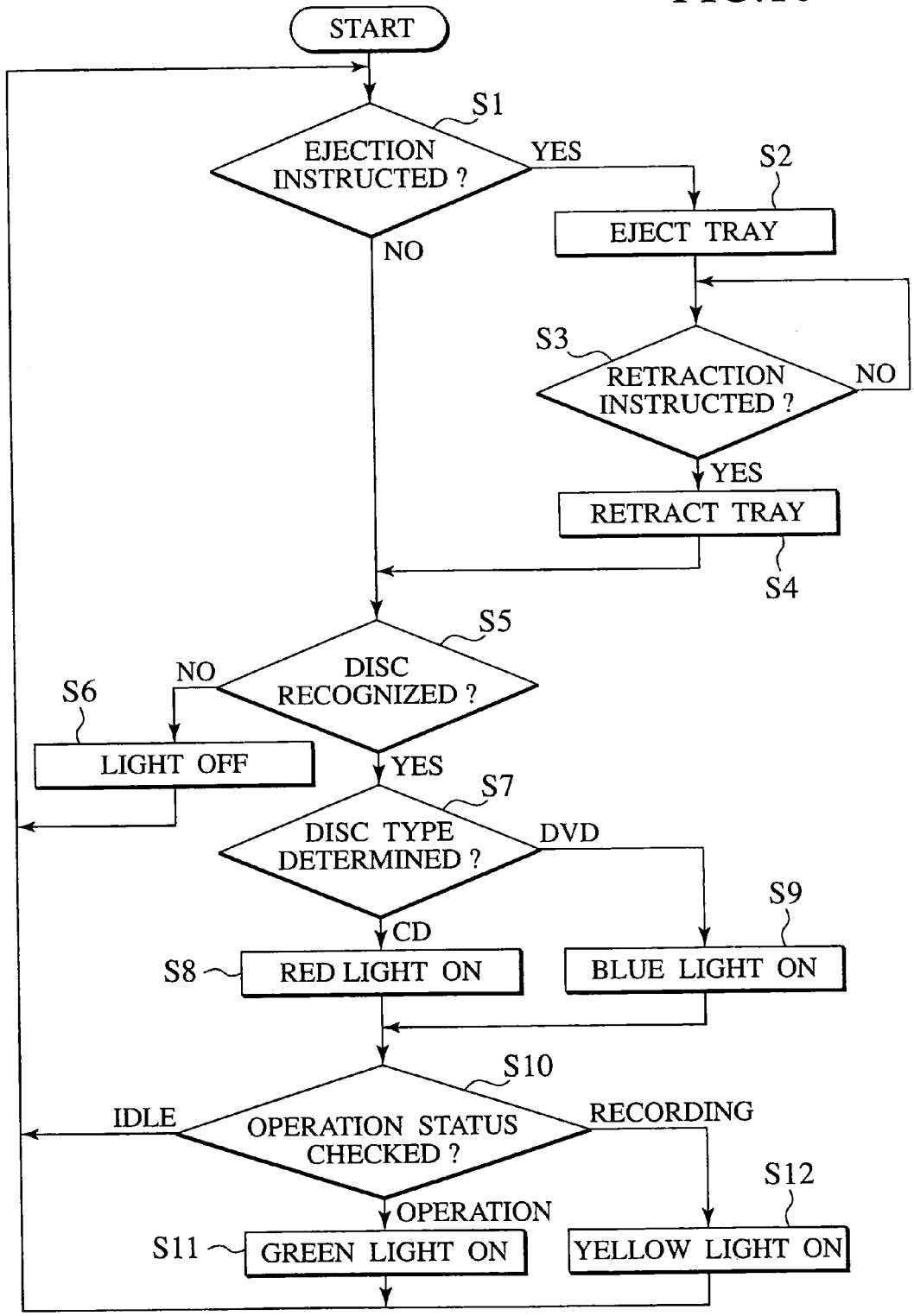
FIG. 16 is a flowchart for explaining an example of operation in the fourth embodiment.

In FIG. 16, when the program stored in the ROM 21 starts to run, the controller 160 determines whether the tray 62 is instructed to be ejected (step S1). Then, the controller 160 ejects the tray 62 when so instructed (step S2) and otherwise steps forward to step S5. After the tray 62 is ejected, the controller 160 determines whether the tray 62 is instructed to be retracted (step S3). Then, the controller 160 retracts the tray 62 when so instructed (step S4) and otherwise returns to step S3.

Next, the controller 160 determines whether the disc D is on the tray 62 or not (step S5). If an absence of the disc D is recognized, the controller 160 turns off the light source 11 (step S6) and returns to step S1. When a presence of the disc D is recognized, the controller 160 determines the size of the disc D (step S7). Also, at step S7, the controller 160 determines whether the disc D is a CD or a DVD based on the TOC information. Then, the controller 160 turns on a red LED of the light source 11 when the disc D is a CD (step S8), or a blue LED of the light source 11 when the disc D is a DVD (step S9).

Due to the above series of processes, a user can quite easily know whether or not a disc is inserted in the casing 1, or whether the disc is a CD or a DVD when the disc is in.

Next, the controller 160 determines an operation status of the disc driving portion 155 (step S10), and returns to step S1 when the disc driving portion 155 is not in the status of reading or writing but in the status of idle. When the disc driving portion 155 is in the status of reading, the controller 160 blinks the green LED of the light source 11 (step S11). When the disc driving portion 155 is in the status of writing, the controller 160 blinks both the red LED and the green LED of the light source 11 in yellow (step S12), which is a color mixture of red and green, and returns to step S1. By the way, when the light source 11 blinks in green (reading) or in yellow (writing), the controller 160 does not step forward to step S8 or S9 but directly to step 10.

When the blinking interval or a period of change in luminous intensity is changed irregularly according to 1/f fluctuation, the disc drive apparatus 1 can provide a relaxation (or mental stress relieving) effect in addition to a decorative effect of light. Incidentally, 1/f fluctuation is a fluctuation (change) that has the characteristics of the power spectrum slope of −1 in a graph representing a logarithmic intensity of a power spectrum on a vertical axis and a logarithmic frequency on a horizontal axis.

Now referring to FIG. 15 again, by providing the RAM 20 of the controller 160 with a user setting table, a user can set through a signal receiver 23 using a remote controller 22 his or her original emitting patterns (a color, a blinking interval, a brightness and the like) of the light from the light source 11. The emitting patterns could depend on a title of music, an artist name and the like. The controller 160 recognizes a title of music and an artist name based on the TOC information stored on the disc D to allow the light source 11 to emit light according to the emitting patterns set in the user setting table.

Furthermore, a backlight of a display 4 shown in FIG. 10 can also be constituted with the same light emitting elements of the light source 11 and these light emitting elements can be controlled by the controller 160. With this construction, the display 4 can emit light synchronously with the light source 11 provided in the tray 62.

In the fourth embodiment described above, while the light source 11 is mounted between the disc receiving portion 72, 82 and the rear end of the tray 62, the light source 11 is not necessarily mounted at the above-mentioned position. For example, the light source 11 can be built-in in the light diffuser 62A. Also, the light source 11 can be mounted not in the tray 62 but in the vicinity of the opening 5 of the casing 1. With these constructions, the light from the light source 11 can exit outwardly only through the light diffuser 62 when the tray 62 is retracted in the casing 1.

A Fifth Embodiment

Figure 17:
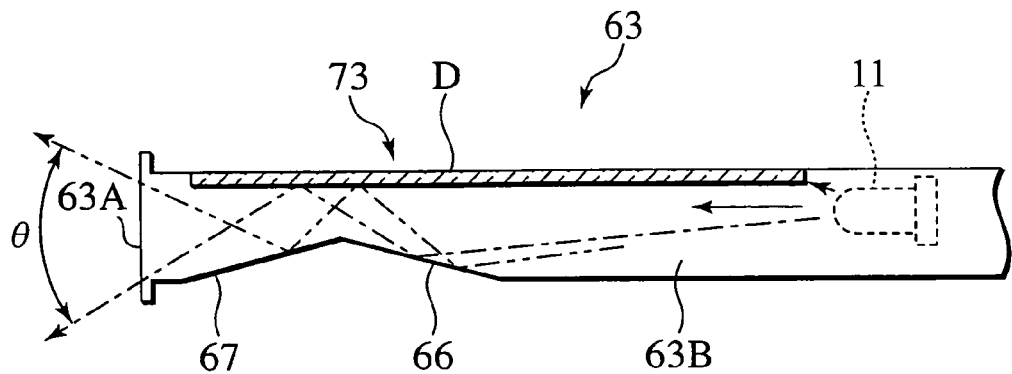
FIG. 17 is a schematic side view of the tray according to the fifth embodiment.
Figure 18:
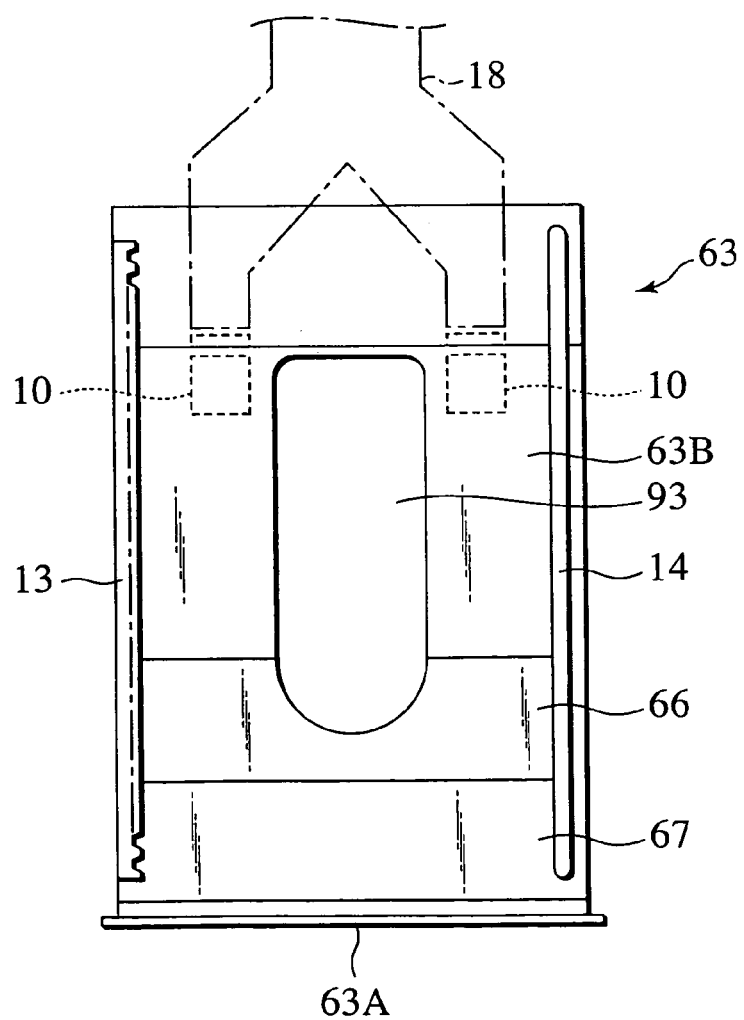
FIG. 18 is a bottom view of the tray according to the fifth embodiment.
Figure 19:
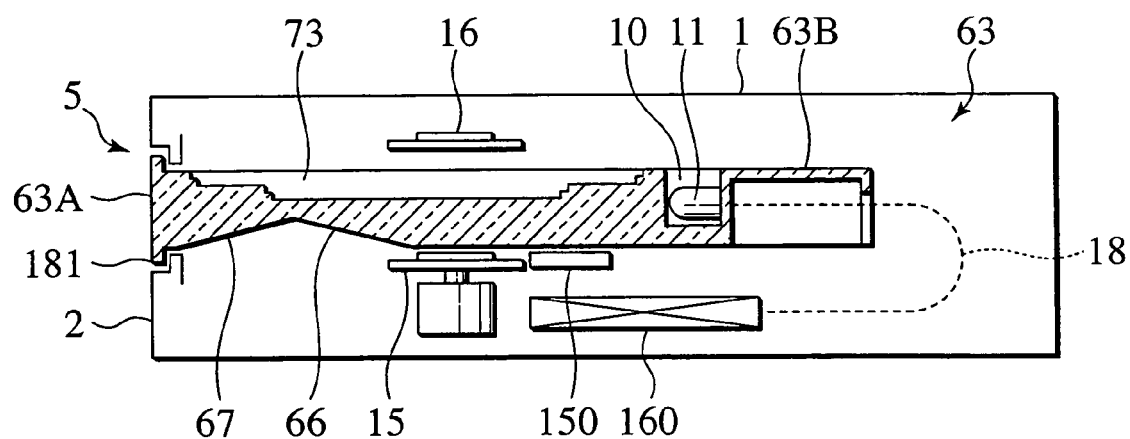
FIG. 19 illustrates that the tray according to the fifth embodiment is retracted inside a casing.

Referring to FIGS. 17 to 19, a fifth embodiment according to the present invention is described. In the drawings, like numerals may be given to substantially the same members or components as those in the first to the fourth embodiment and unnecessary explanation is omitted for the substantially the same members or the like.

In a tray 63 according to the fifth embodiment, a first reflection face 66 and a second reflection face 67 are provided on an opposite side of a tray body 63B from a disc receiving portion 73 so as to be slanted with respect to the disc receiving portion 73, the tray body 63B being formed of a transparent material. Light emitted from a light source 11 to propagate in the tray body 63B is reflected by the first reflection face 66 and the reflected light is irradiated on an information-bearing face of a disc D placed in the disc receiving portion 73. The irradiated light is reflected by the information-bearing face of the disc D and is then incident upon the tray body 63B, part of which is emitted out from a light diffuser 63A that is a front edge portion of the tray 63 in an ejection direction.

In addition, another part of the light incident upon the tray body 63B after being reflected by the information-bearing face D is reflected by the second reflection face 67 and thereby emitted out from the light diffuser 63A.

Therefore, in the fifth embodiment, the light emission portion 63A is entirely illuminated at a view angle of theta (θ) in FIG. 17. The view angle can be varied by changing an angle of the light reflection faces 66, 67 with respect the disc receiving portion 73. At any rate, the first reflection face 66 is preferably provided at an angle that allows the face 66 to totally reflect the light from the light source 11 toward the disc receiving portion 73.

It should be noted that a light source mounting portion 10, a rack 13, a guide groove 14, and a flexible electrically conductive member 18 are substantially the same as those illustrated in FIGS. 11 and 13. In addition, a cut-out portion 93 is substantially the same as the cut-out portion 92 in FIG. 11.

FIG. 19 illustrates where the tray 63 has been retracted inside of a chassis 1, as is the case with FIG. 14. In FIG. 19, a reference numeral 181 represents a flange that closes an opening 5 in order to prevent dust from entering the chassis 1. In addition, a reference numeral 2 in FIG. 19 is an operation portion, as is the case with FIG. 1.

The light diffuser 63A located at the opening 5 outwardly emits the light from the light source 11 as described above. Thus, the light diffuser 63A exerts an excellent decorative effective of illumination, even when the tray body 63B is retracted in the chassis 1. Moreover, even if the tray body 63B is ejected, since the light from the light source 11 propagates in the tray body 63B, the light emission portion 63A glows when a disc D is placed on the disc receiving portion 73. Therefore, the disc D is easily and appropriately removed even in a dimly lit circumstance.

In addition, when a disc D is not placed on the disc receiving portion 73, a disc D can be placed.

In the fifth embodiment, while as the light source 11 can be used a monochromatic light source emitting red, green, or blue light, a incandescent lamp or a white light emitting diode that emits white light is preferably used as the light source 11. Due to such a type of light source 11, various patterns of illumination according to a surface color of the disc D can be realized.

Namely, in case the light source 11 emits light containing a broad range of wavelengths in the spectrum, one face of the tray body 63B (the light emission portion 63A) can be illuminated by rainbow-colored light due to diffraction by pits formed on the disc D. In addition, when the light from the light source 11 contains the same wavelengths as those of the interference color seen on the surface of the disc D, the face of the tray body 63B can be illuminated in the interference color of the disc D regardless of a color of the light emitted from the light source 11.

In the fifth embodiment, although the light source mounting portion 10 and the light source 11 are provided in the tray body 63B, they may be arranged in a portion of the chassis 1, the portion facing a rear edge face of the tray body 63B. Even in this case, the light diffuser 63A glows sufficiently when the tray body 63B of which the disc receiving portion 73 has the disc D disposed thereon is retracted inside the chassis 1. When the tray body 63B is ejected, the light from the light source 11 provided therein is guided in the tray body 63B to emit out from the light diffuser 63A and thereby the light diffuser 63A can glow although the light amount is slightly reduced. Furthermore, while it is preferable that the tray body 63B should be entirely transparent, it may be partially transparent.

By the way, in the first to the fourth embodiment above, although an optical disc such as a CD, a CD-R, a DVD or the like are exemplified as the disc D, the disc D may be a magneto-optical disc. In other words, the present invention is applicable to recording/reproducing equipment utilizing various discs. Furthermore, the present invention is applicable to any type of recording/reproducing equipment utilizing any type of information recording medium.

The first to the fifth embodiment can be randomly combined and any combined embodiments also fall within the scope of the invention.

What is claimed is:

1. A disc drive apparatus comprising:
   a casing,
   a tray formed of an optically transparent material, including a disc receiving portion for a disc to be placed on and being movable in an ejection and a retraction direction in relation to said casing, said tray having a first reflection face reflecting light that enters said tray so as to illuminate a disk face of said disc placed on said disc receiving portion and said tray reflecting light that is reflected by said disc face so as to enter therein and thereby to radiate outward, and
   a light source allowing light to enter said tray.

2. A disc drive apparatus as recited in claim 1, wherein said tray has a second reflection face reflecting light that has entered therein by being reflected by said disc face of said disc so as to radiate outward.

3. A disc drive apparatus as recited in claim 1, wherein said light source is mounted inside of said tray.

4. A disc drive apparatus as recited in claim 1, wherein said tray has a luminous portion adopted to outwardly radiate the light emitted from said light source.

5. A disc drive apparatus as recited in claim 4, wherein said luminous portion includes a front end portion of said tray with respect to the ejection direction.

6. A disc drive apparatus as recited in claim 4, wherein said luminous portion includes a circumferential edge of said disc receiving portion.

7. A disc drive apparatus as recited in claim 3, wherein said light source stays inside of said casing when said tray is ejected from said casing.

* * * * *